United States Patent [19]

Blahut

[11] 3,784,922

[45] Jan. 8, 1974

[54] ADAPTIVE DELTA MODULATION DECODER

[75] Inventor: Donald Edgar Blahut, Bloomfield, N.J.

[73] Assignee: Bell Telephone Laboratories, Incorporated, Murray Hill, Berkeley Heights, N.J.

[22] Filed: June 22, 1971

[21] Appl. No.: 155,582

[30] Foreign Application Priority Data

Mar. 20, 1972 Sweden .......... 236315/72

[52] U.S. Cl. .......... 329/104, 325/38 B, 328/119

[51] Int. Cl. .......... H03k 13/22

[58] Field of Search .......... 329/104; 328/119; 307/236; 332/11 D; 325/38 B; 179/15 AP

[56] References Cited

UNITED STATES PATENTS

| | | | |
|---|---|---|---|
| 3,497,624 | 2/1970 | Brolin | 332/11 D X |
| 3,609,551 | 9/1971 | Brown | 325/38 B |
| 3,643,180 | 2/1972 | Shimamura | 332/11 D |
| 3,628,148 | 12/1971 | Brolin | 325/38 B |
| 3,500,441 | 3/1970 | Brolin | 325/38 B X |

*Primary Examiner*—Alfred L. Brody
*Attorney*—E. J. Olinder

[57] ABSTRACT

In an adaptive delta modulation system, step sizes are instantaneously companded by digital logic which controls the charging or discharging time interval of an integrating capacitor. A high speed timer divides each frame period into a plurality of equal time segments. A constant current source arranged to charge or discharge the capacitor is actuated simultaneously with the first timing pulse during each frame period. Current source ON time is determined by coincidence logic which associates with each possible step size a given number of time segments. Syllabic companding is simultaneously achieved by varying the magnitude of the current source output in accordance with the input signal envelope.

11 Claims, 6 Drawing Figures

INVENTOR
D. E. BLAHUT
BY
ATTORNEY

ADAPTIVE DELTA MODULATION DECODER

BACKGROUND OF THE INVENTION

1. Field of the Invention

This invention relates to decoders for use in variable step size delta modulation systems and, more particularly, to such decoders in which digital logic is provided to control the attainment of desired step sizes.

2. Description of the Prior Art

The use of adaptive (variable step size) delta modulation (ADM) systems has increased over the last several years as a result of the relative simplicity and efficiency with which such systems enable digital transmission of analog signals. With this proliferation in usage has come a concomitant increase in the sophistication of the decoder apparatus employed, since its proper functioning largely determines the overall performance of the entire ADM system.

Three main functions are performed by the decoder digital logic circuitry. First, a determination is made as to when step sizes are to be changed. Second, the magnitude of the individual step changes is selected. Third, each step change is converted to its analog equivalent. Each of the above functions must be performed with a high degree of accuracy and consistency, since any distortion introduced in the decoding process will result in the degradation of signal fidelity.

The process of automatically varying step sizes (amplitudes) in response to changes in input signal characteristics is commonly referred to as companding, the term being derived from compressing at the transmitter and expanding at the receiver the signal dynamic range. Most prior art companding schemes may be classified into one of two types: instantaneous or syllabic. In the former, step amplitude adjustments are based upon a relatively short term analysis of the encoded version of the input signal. Where a sequence of encoder output bits is of the same polarity, a slope overload condition is indicated, and the amplitude of step changes is increased to more rapidly correspond to the input signal. If, on the other hand, the bit sequence alternates in polarity, a close correspondence between the input ane output signals is indicated, and step amplitudes are reduced in order to minimize quantizing error. In comparison, syllabic companding is based on a relatively long term average of the input signal, and serves to extend the system dynamic range by making step size adjustments based on the relatively slow changing characteristics of the input signal envelope.

The process of selecting a particular weighting scheme to optimally adapt the amplitude of step changes to the type of signal being transmitted has also been the subject of much activity in the prior art. Various adaption logic arrangements have been devised, wherein step amplitude changes are interrelated by linear, exponential or logarithmic functions.

Besides being equipped with means to determine both when step changes are to be made, and the appropriate amplitudes of the individual steps, an ADM system must also be equipped with means that enable the conversion of each size step to its analog equivalent. Various means have been devised to carry out the above-mentioned conversion, and each generally involves charging or discharging an integrating capacitor or other energy storing element in an amount proportional to the particular step amplitude involved. Control of the capacitor voltage has been achieved in the prior art by directly varying the magnitude of the output of a current source, by arranging a resistive matrix and a fixed voltage source so that an appropriate resistor is inserted in the charging or discharging path, or by transferring charge from a holding capacitor to the integrating capacitor an appropriate number of times.

Each of the above conversion means has certain serious drawbacks. For example, the resistive matrix apparatus is limited in the number of step amplitudes it can efficiently and economically accommodate, since an individual resistance is needed for each available step size. Extensive modification of the matrix is required when changes to the adaption logic are desired. In addition, since the decoder apparatus used in both the transmitter and receiver must be matched with great precision in order to minimize system distortion, the matrix resistor values must be held to extremely close tolerances. If a variable current source is employed, accurate control of the desired discrete step changes becomes difficult, again introducing distortion into the reconstructed output signal. Where discrete charge parcelling is used, each decoder output bit is made up of a large number of discrete step changes, thus undesirably adding to quantization noise.

Additionally, while each of the above-mentioned prior art systems can provide either instantaneous or syllabic companding capabilities, depending upon the particular memory device employed, they do not perform both functions simultaneously.

In view of the foregoing problems, it is therefore a broad object of the present invention to improve and simplify adaptive delta modulation decoders. One important specific object of the invention is to provide in an ADM decoder, means for simultaneously achieving both instantaneous and syllabic companding capabilities. Additional specific objects include the minimization of quantization noise, the enhancement of step size variability and accuracy, and the improvement in the ease with which the adaption logic arrangement may be changed.

SUMMARY OF THE INVENTION

The foregoing and additional objects are achieved in accordance with the principles of the invention by an instantaneous and syllabic companding decoder wherein digital logic is employed to control the charging or discharging time interval of current supplied to an integrating capacitor or other energy storing element, and a voltage proportional to the input signal envelope is used to control the magnitude of the integrating current. More specifically, step sizes are instantaneously companded in a basic decoder in accordance with the invention by first monitoring in a memory device the encoded version of the input signal to detect the occurrence of successive bits in a sequence which indicates the existence of a slope overload condition. In this event, an increase pulse is transmitted to a step size counter increasing its count. Where, on the other hand, the bit sequence indicates that step sizes are too large, a decrease pulse is generated instead to decrease the count. The magnitudes of the individual steps are next interrelated in accordance with a particular adaption scheme by associating with each count a time interval which is proportional to the desired step amplitude. To this end, a high speed timer is provided to divide each frame period into a plurality of equal segments. A constant current source arranged to supply its output to an integrating capacitor is actuated simultaneously with the first timing pulse during each frame period. Current source ON time is determined by coincidence logic which terminates the charging or discharging time interval after a number of time segments corresponding to the count attained in the step size counter. The integrating capacitor voltage change during each frame period is thus a function of the count attained in the adaption scheme employed.

A syllabic companding feature is incorporated in the basic decoder by the addition of means for advantageously utilizing the increase and decrease pulses generated by the memory device to increase and decrease a control voltage stored on an auxiliary capacitor or other energy storage element. The resulting control voltage waveform, which approximates the input signal envelope, is then used to modulate the magnitude of the current source output. By the simultaneous provision of instantaneous and syllabic companding, step size variations are made to depend on both the short and long term variations of the input signal. As a result, the analog signal reconstructed from the binary bit stream is a more faithful replica of the original input signal. Alternatively, the increase in fidelity provided by simultaneous instantaneous and syllabic companding of step sizes permits a reduction in the required ADM system sampling frequency while maintaining an acceptable level of distortion.

Since one feature of a basic decoder in accordance with the invention is the division of each frame period into a large number of equal time segments, a predetermined number of which are associated with each possible step size, such decoders may advantageously accommodate a large number of possible step amplitudes with an accuracy dependent primarily on the accuracy of the high speed timer means employed. In ADM systems in which the transmitter and receiver terminals are synchronized, decoder accuracy may therefore be improved.

Another advantage of decoder apparatus in accordance with the invention is the facility with which modifications in the adaption logic arrangement may be made. This advantage is realized by virtue of the fact that changes in the association between each possible step amplitude and a corresponding current source ON time are made simply by minor readjustments in the coincidence logic circuitry. It is not necessary to redesign a resistive matrix or to change any component values.

Yet another advantage of the invention is the reduction of high frequency quantization noise. This advantage results from the decoder arrangement which permits the attainment of an integrating capacitor voltage waveform in the form of a ramp followed by a period of constant voltage, rather than by a series of discrete step changes having undesirable high frequency components.

BRIEF DESCRIPTION OF THE DRAWING

The above and other objects, advantages and features of the present invention will become more readily apparent from the following detailed description taken together with the accompanying drawing in which.

DETAILED DESCRIPTION

Figure 1:
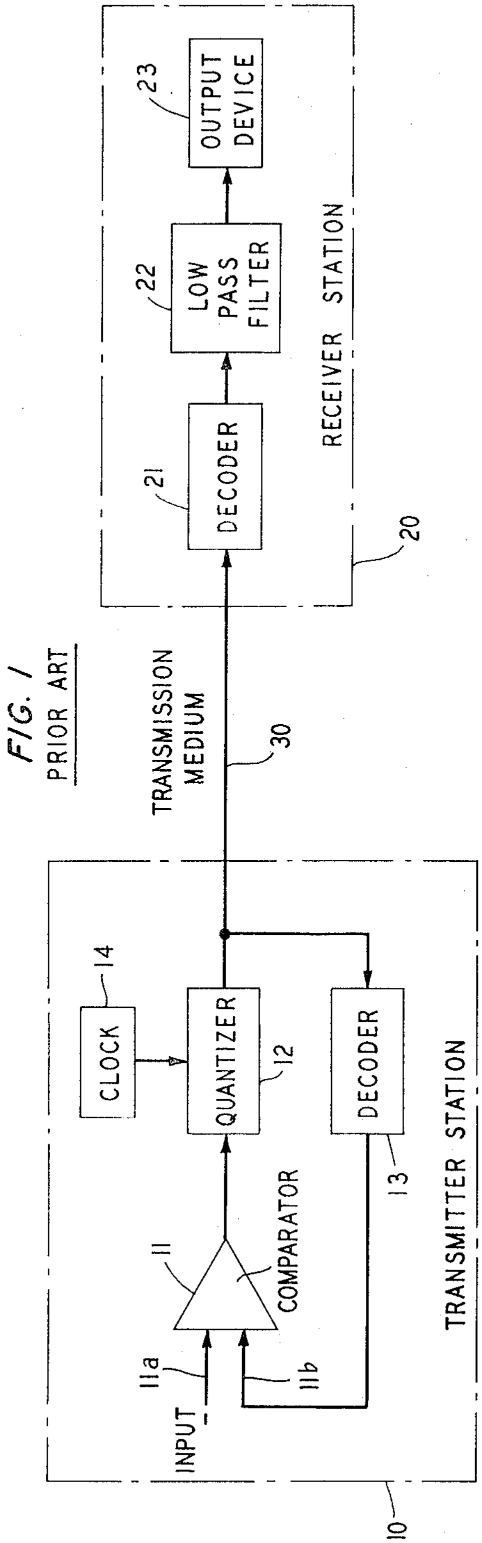
FIG. 1 is a block diagram of a prior art delta modulation system.

FIG. 1 depicts in block diagram form a delta modulation system well known in the prior art. The system consists of a transmitter station 10, a receiver station 20, and a transmission medium 30 connecting the stations. The transmitter station comprises a direct path, including comparator 11 and quantizer 12, and a feedback path including decoder 13. Comparator 11 is arranged to generate an output voltage of a polarity indicative of the difference between signals applied at its input terminals 11$a$, 11$b$, one of which is the analog signal to be encoded. The comparator output is applied to quantizer 12, which, under the control of clock 14, generates a stream of binary bits at the clock frequency. The quantizer may, for example, be arranged to produce a positive bit 1 for a positive comparator output, and no bit 0 for a comparator output that is negative. This bit stream is both transmitted to receiver station 20 via transmission medium 30 and simultaneously applied to the input terminal of decoder 13, which reconverts the binary bit stream to a replica of the original input signal. The reconverted signal is applied to the second input terminal 11b of comparator 11, thereby completing the feedback loop. Thus, the difference between the analog signal to be encoded and its reconverted equivalent are continuously compared in comparator 11, and only the difference signal is transmitted by the quantizer as a stream of binary bits.

The bit stream received at station 20 via transmission medium 30 is converted from digital to analog form by decoder 21, which assuming the absence of transmission errors, may be identical to decoder 13. The signal thus recovered, which also will be a replica of the original input signal, may be filtered by low-pass filter 22 to remove unwanted high frequency components before being applied to a suitable output device 23.

Figure 2:
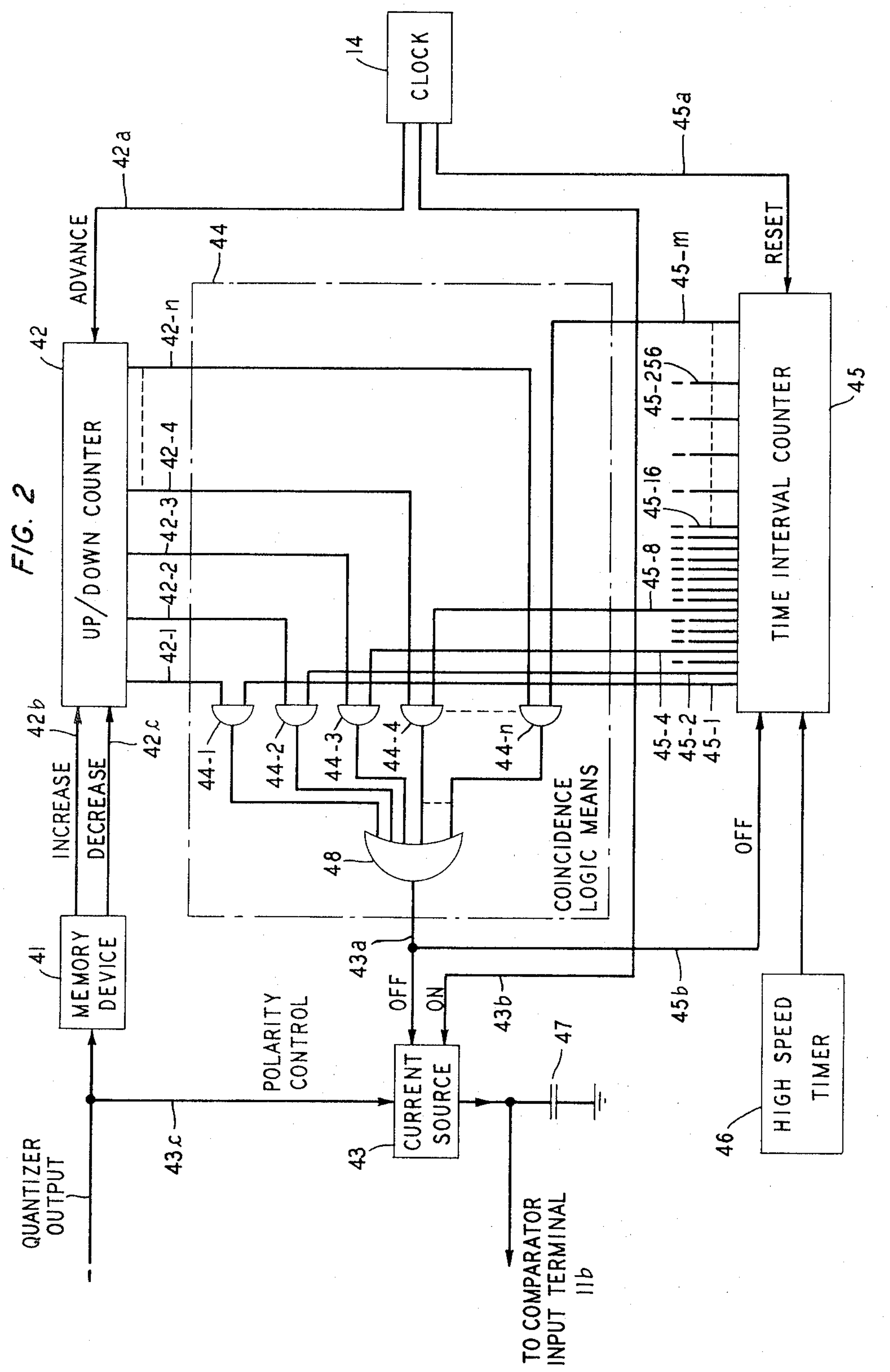
FIG. 2 is a block diagram of the decoder portion of FIG. 1 which embodies the principles of the present invention.

Referring now to FIG. 2, there is depicted in block diagram form the decoder 13 of FIG. 1 arranged in accordance with the principles of the invention to provide instantaneous companding. The decoder comprises memory device 41, up/down counter 42, high speed timer 46, time interval counter 45, coincidence logic means 44, current source 43, and integrating capacitor 47.

The output bit stream of quantizer 12 is first processed in memory device 41, which is arranged to determine when step sizes are to be changed. Thus function may be achieved by a multibit memory which is programmed to change step sizes in the presence of certain predetermined bit squences which are indicative of an increase or a decrease in the magnitude of the deviation of the analog signal from its instantaneous value. Where an increasing deviation is detected, the slope of the analog signal is increasing, and step sizes must accordingly be increased if the decoder output is to correspond closely to the analog signal. On the other hand, where the slope is decreasing, it is advantageous to decrease step sizes so that the decoder can reproduce faithfully small changes in the analog input signal.

The optimum number of bits that must be considered in making up a sequence indicative of a step size adjustment, and the relative weight to be accorded to the more remote bits in the sequence, are factors which have been studied thoroughly in the prior art. For the purpose of describing the present invention, it is sufficient to say that the function of determining when step sizes are to be changed may more simply be achieved in accordance with the principles set forth by N. S. Jayant in "Adaptive Delta Modulation with a One-Bit Memory," *Bell System Technical Journal*, March 1970, whereby a one bit memory is utilized to monitor the binary bit stream in order to determine the occurrence of successive bits of the same polarity (i.e., both 1's or 0's). A determination that the polarity of the present bit is the same as that of the preceding bit stored in the memory indicates a slope overload condition, and an increase pulse is transmitted to up/down counter 42. On the other hand, where successive bits are of different polarities, a close correspondence exists between the input signal and the decoder output, and a decrease pulse is transmitted instead. It may be advantageous, for purposes to be explained hereinafter, to arrange memory device 41 to produce increase and decrease pulses of a width equal to that of quantizer output bits.

The output bit stream of quantizer 12 is also utilized to control the polarity of the current supplied to or removed from integrating capacitor 47. Since a positive bit 1 indicates that the analog input signal is increasing in magnitude, current source 43 is arranged in any well known manner to charge capacitor 47 when a positive voltage is applied to control terminal 43*c*. Conversely, when no bit 0 is present, current source 43 is arranged to discharge that capacitor. Hereinafter, reference to the output of current source 43 should accordingly be understood to include both positive and negative current polarities.

The increase and decrease pulses generated by memory device 41 must next be continuously accumulated and assembled in a digital form which permits the assignment of a particular magnitude to each possible step change. One convenient means for performing this function is an up/down counter 42, which is synchronized to the quantizer bit frequency by clock 41 via advance control line 42a, and arranged to count UP for each increase pulse received on line 42b to a maximum count of *n*, and to count DOWN for each decrease pulse received on line 42c to a minimum count of 1. A plurality of output terminals, labelled 42–1 through 42–*n*, is arranged to correspond to the *n* possible counts of counter 42. The individual output terminal energized at any particular time therefore represents the relative magnitude of the desired step change.

Each count of up/down counter 42 must next be associated with a step change of a particular magnitude, and the change then converted to analog form. Briefly, these functions are performed in accordance with the principles of the invention by assigning to each step change a particular time interval, $t_i$, of each frame period $t_f$ during which current source 43 is allowed to charge or discharge integrating capacitor 47. During this interval, the voltage on capacitor 47 will change by an amount given by:

$$\frac{1}{c}\int_0^{t_i} i\,dt \qquad (1)$$

where:

$c$ = capacitance of capacitor 47

$i$ = current supplied or consumed by current source 43.

Since both $i$ and $c$ may be held time invariant during the charging or discharging interval, equation (1) may be rewritten as:

$$(I/c)t_i \qquad (2)$$

where:

$I$ = the steady state value of $i$.

Accordingly, by appropriately controlling the length of time interval $t_i$, which is the only variable in equation (2), each possible count of up/down counter 42 may be converted to an associated voltage change with an accuracy that depends primarily on the accuracy with which $t_i$ is determined.

In order to provide accurate control of the charging or discharging time interval $t_i$ of integrating capacitor 47, each frame period $t_f$ is divided into a plurality of equal time segments by high speed timer 46 in conjunction with time interval counter 45. To accomplish this division, high speed timer 46 is arranged to produce clock pulses at a frequency *m* times greater than that of clock 14. Thus, time interval counter 45, which is reset at the beginning of each frame period by clock 14 via line 45a, counts from 1 to *m* during each frame period $t_f$, dividing said period into *m* equal segments of duration $t_f/m$. Each of the *m* output terminals 45–1 through 45–*m* of time interval counter 45 accordingly represents the end of a charging or discharging interval, $t_i$, measured from the beginning of each frame period, which is an integral multiple of the basic time segment $t_f/m$.

The association between each of the *n* possible counts of up/down counter 42 and a particular number of $t_f/m$ time segments is accomplished in coincidence logic means 44, which comprises AND gates 44–1 through 44–*n* and OR gate 48. To one input terminal of each AND gate is connected a corresponding one of the output terminals of up/down counter 42. The second input to each AND gate is supplied by a particular output terminal of time interval counter 45, in accordance with a desired adaption scheme explained more fully below. The output terminals of AND gates 44–1 through 44–*n* are each applied to the input terminals of OR gate 48, the output terminal of which is connected to OFF control terminal 43a of current source 43.

Figure 3:
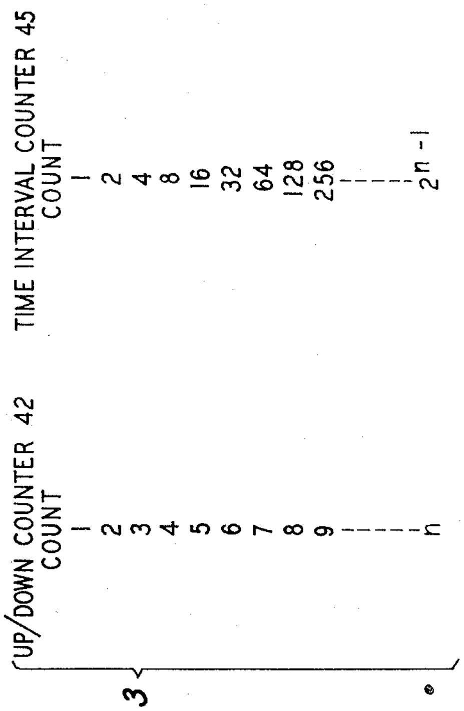
FIG. 3 lists in tabular form one possible arrangement of the coincidence logic portion of FIG. 2.

Before proceeding with a description of the operation of coincidence logic means 44, it will be helpful to describe one possible adaption scheme that may be used to interconnect the *n* output terminals of up/down counter 42 with particular ones of the *m* output terminals of time interval counter 45. For this purpose, a second order exponential scheme has been listed in tabular form in FIG. 3. The first column of the table represents the *n* possible counts of up/down counter 42, the output terminals of which, it will be recalled, are each connected to the first input terminals of respective AND gates 44–1 through 44–*n*. The second column of the table lists, for this adaption scheme, the counts of time interval counter 45 that correspond to those of the first column. This correspondence is achieved electrically by connecting to the second input terminals of each AND gate 44–1 through 44–$n$ the output terminal of time interval counter 45 that represents the count in column 2. Thus, for example, count 4 of up/down counter 42 is associated with count 8 of time interval counter 45 in AND gate 44–4; count 7 of the former and count 64 of the latter are associated in AND gate 44–7, and so on. For proper operation using this particuar adaption scheme, it should be apparent that $m$ must be at least equal to $2^{n-1}$. It should also be noted that only some of the $m$ output terminals of time interval counter 45 are utilized.

While a second order exponential adaption scheme has been described above, it is to be clearly understood that other schemes may be used with equal success. Changes may be made simply by readjusting the connections between the second input terminals of each AND gate and the output terminals of time interval counter 45.

Returning now to FIG. 2, it will be notd that clock 14 is arranged to turn current source 43 ON via control terminal 43$b$ at the beginning of each frame period, as well as to reset time interval counter 45. The current source remains ON as the count of the latter proceeds, until a time interval $t_i$ is reached at which a correspondence exists between the counts of up/down counter 42 and time interval counter 45. At that instant, a particular AND gate is energized. Since all of the output terminals of AND gates 44–1 through 44–$n$ are connected to input terminals of OR gate 48, the latter is also energized, thus turning current source 43 OFF until the beginning of the next frame period, when the cycle is repeated with a new count in up/down counter 42.

The OFF command generated by OR gate 48 may also be utilized to inhibit, via line 45b, the counting sequence of time interval counter 45 during the portion of each frame period subsequent to the attainment of a correspondence in coincidence logic means 44. By so doing, the unnecessary portion of the counting sequence is eliminated. Since the counting process contributes substantially to overall decoder power consumption, an unneeded power drain is thus removed.

The voltage across integrating capacitor 47, which represents the reconverted version of the quantizer output bit stream, is returned to input terminal 11$b$ of comparator 11, thus completing the feedback path within transmitter station 10. It should be noted that decoder 21 of receiver station 20, which is identical to the decoder depicted in FIG. 2, receives its input bit stream directly from transmission medium 30, and supplies the output voltage across capacitor 47 to lowpass filter 22.

Figure 4A:
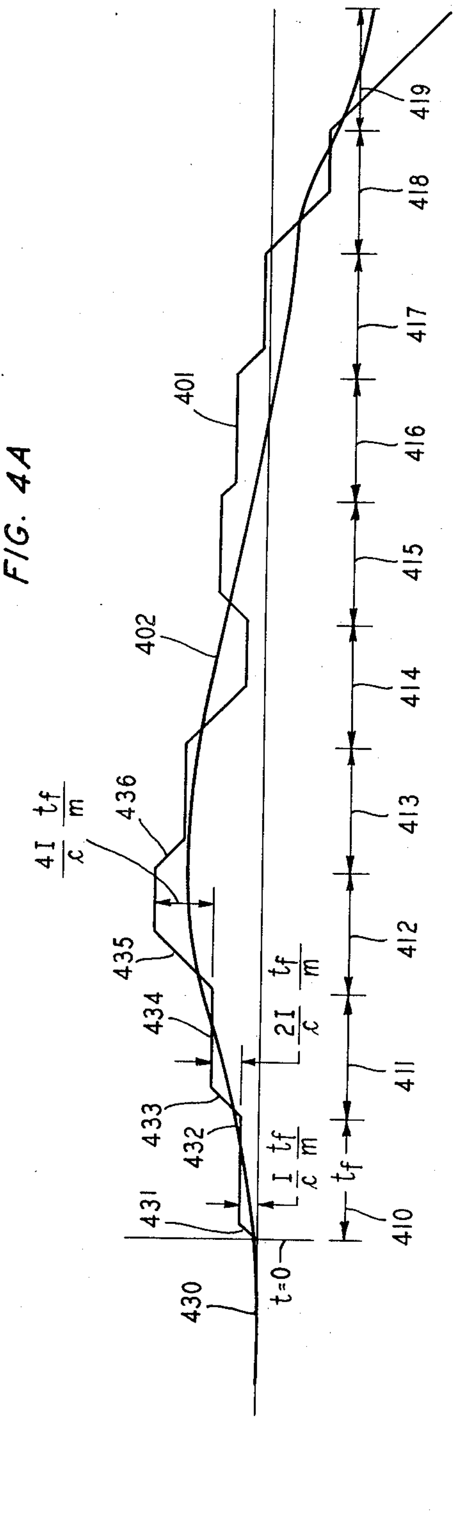
FIG. 4A depicts an output voltage waveform of the integrating capacitor of FIG. 2 corresponding to a typical analog input signal.
Figure 4B:
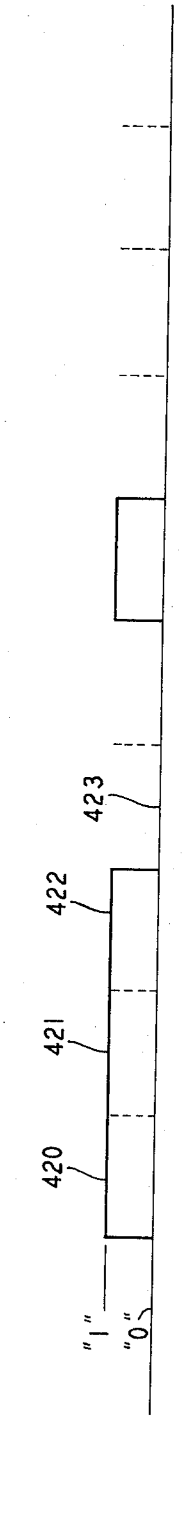
FIG. 4B depicts the binary bit stream output of the quantizer of FIG. 2 which corresponds to the same analog input signal.

In order to appreciate more fully the operation of the decoder of FIG. 2, the output voltage waveform 401 across capacitor 47 and a typical analog input signal 402 to which it corresponds are depicted in FIG. 4A. FIG. 4B shows the binary bit stream output of quantizer 12 for the same input signal. For simplicity of description, it is assumed that up/down counter 42 is limited to four possible step amplitudes which are interrelated in accordance with the second order exponential adaption scheme listed in FIG. 3. Thus, high speed timer 46 must be arranged to provide timing pulses at a frequency $m$ at least eight times greater than that of clock 14. It is to be understood, however, that a decoder having a different number of possible step amplitudes or another adaption scheme will operate in substantially the same manner.

The horizontal axes in FIGS. 4A and 4B, which represent time, are divided into frame periods 410 through 419 of width $t_f$ by clock 14. At the beginning of the first frame period 410, the input voltage applied to input terminal 11a of comparator 11 is more positive than the initial voltage 430 on capacitor 47, causing comparator 11 to produce a positive output voltage. Quantizer 12, in turn, produces a positive 1 output bit 420 which is transmitted to receiver station 20 and simultaneously applied to the input terminal of decoder 13. Memory device 41 next compares positive bit 420 to the previous bit, which, of course, was a 0 prior to the start of the encoding sequence. Accordingly, the successive bits are different in polarity, and a decrease pulse is transmitted to up/down counter 42. Assuming that up/down counter 42 was initially set at its minimum count of 1, the count will therefore remain unchanged.

Positive quantizer bit 420 also prepares current source 43 to charge integrating capacitor 47. Charging begins at the beginning of frame period 410, increasing the voltage 431 on capacitor 47 at the rate of $I/c$ volts/second. When time interval counter 45 reaches a count of 1, representing an elapsed charging time $t_1$ of $t_f/m$ seconds, a correspondence with the count in up/down counter 42 is achieved, and the charging series is terminated. For the remainder of frame period 410, the capacitor voltage 432 remains at a value $(I/c)(t_f/m)$ volts above its initial level.

At the beginning of frame period 411, the analog input voltage is again greater than the voltage on capacitor 47. Accordingly, positive quantizer output bit 421 is produced. As a result of the successive positive bits now present in memory device 41, an increase pulse is transmitted to up/down counter 42, increasing its count to two. The corresponding ON time $t_i$ of current source 43 is therefore 2 $t_f/m$ seconds, further increasing the voltage 433 on capacitor 47. For the remaining portion of frame period 411, the voltage 434 on capacitor 47 is constant at a level 2 $(I/c)$ $(t_f/m)$ volts above its previous value.

During frame period 412, the above process is again repeated, producing positive output bit 422. However, the count in up/down counter is increased to three, which corresponds to a charging interval $t_i$ of 4 $t_f/m$ time segments and an associated voltage increase 435 of 4 $(I/c)$ $(t_f/m)$ volts on capacitor 47.

As shown in FIG. 4A, the analog input signal is more negative than the voltage on capacitor 47 at the beginning of frame period 413. As a result, quantizer 12 produces no output 423 during this period. The 0 bit, when compared to the previous bit in memory device 41, causes the count in up/down counter 42 to decrease to 2. Accordingly, current source 43, which is now prepared to discharge capacitor 47, remains ON for 2 $(t_f/m)$ time segments. The voltage 436 on capacitor 47 thus decreases by 2 $(I/c)$ $(t_f/m)$ volts.

The remainder of FIGS. 4A and 4B, when viewed in connection with the preceding description, should be adequately understood without the need for further detailed explanation. It should be sufficient to note that the counts of up/down counter 42 for the remaining frame periods 414–419 are 3,2, 1, 2, 3, and 4, respectively, corresponding to voltage changes of 4, 2, 1, 2, 4, and 8 multiples of $(I/c)$ $(t_f/m)$.

Observation of FIG. 4A reveals that the output voltage across capacitor 47 comprises a series of ramp increases and decreases as well as constant voltage sections. No step discontinuities are present, the transitions between and within frame periods being relatively smooth. As a result, the output of decoder 21 of receiver station 20 will contain fewer undesirable high frequency components characteristically produced by prior art decoders, thereby reducing quantization noise.

It also may be noted from FIG. 4A that the output voltage waveform 401 across capacitor 47 appears to be only a crude approximation of the analog input signal 402 which it represents. This discrepancy is a result of the limiting assumptions that were made concerning the maximum count attainable in up/down counter 42 and the graphical expansion of the time scale used in FIG. 4A to represent more clearly the operation of the decoder. In reality, the correspondence achieved between the above-mentioned waveforms is quite satisfactory; for example, faithful transmission of speech signals has been attained in accordance with the invention by utilizing a frame period of about 20 microseconds, eight possible step amplitudes, and a high speed timing means frequency of approximately 8 MHz.

Figure 5:
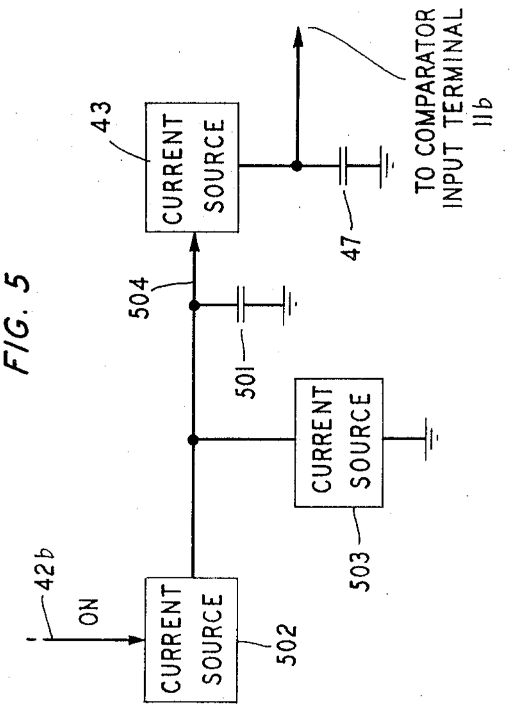
FIG. 5 is a block diagram of apparatus which may be added to the decoder of FIG. 2 in order to provide a syllabic companding capability.

FIG. 5 illustrated, in block diagram form, apparatus which when added to the decoder of FIG. 2 will provide thereto the additional feature of syllabic companding. This apparatus comprises capacitor 501 and current sources 502, 503, which are respectively arranged to deliver current to, and subtract current from that capacitor. Also shown in FIG. 5, for the sake of completeness, are integrating capacitor 47 and current source 43 of FIG. 2. To the latter has been added control terminal 504, the function of which will become apparent hereinafter.

As stated previously, the purpose of syllabic companding is to enable step size adjustments based on the relatively slow changing characteristics of the input signal envelope. Stated another way, it is desirable in a syllabic decoder to provide a means designed to modulate the current supplied to or extracted from the integrating capacitor in proportion to the deviation of the input signal from its average value over a time period that is relatively long in comparision to a frame period. One indication of this deviation can be obtained directly from the output of memory device 41, since it provides an increase pulse on line 42*b* whenever the input signal is increasing or decreasing rapidly from its average value, and a decrease pulse when the input signal is fluctuating about an average value. Accordingly, by increasing the current supplied or consumed by current source 43 in response to incerase pulses, and otherwise reducing the charging or discharging current supplied to integrating capacitor 47, the modulating effect characteristic of syllabic companding may be achieved.

The apparatus of FIG. 5 accomplishes this result by varying the output of current source 43 in accordance with a voltage which in turn depends upon the increase pulses generated by memory device 41. To this end, current source 502 is arranged to charge capacitor 501 only during frame periods in which an increase pulse is received from line 42*b* of memory device 41, while current source 503 is arranged to continuously discharge capacitor 501. If the magnitudes of the outputs of current sources 502, 503 are represented by $I_1$ and $I_2$, respectively, and the capacitance of capacitor 501 is represented by $C_2$, it is thus apparent that the voltage on capacitor 501 will increase by an amount given by $(I_1-I_2)/C_2$ volts/second during frame periods when an increase order is present on line 42b, and decrease by an amount given by $I_2/C_2$ volts/second during all other frame periods. By properly selecting the magnitudes of $I_1$, $I_2$, and $C_2$, the piecewise linear voltage waveform appearing across capacitor 501 can be made to represent an approximation of the input signal envelope. Application of this voltage to control terminal 504 of current source 43, which is arranged in any well-known manner to provide an output current that is directly proportional to said voltage, accordingly results in an integrating current that is modulated by the input signal envelope, thereby providing the desired syllabic companding capability.

It should be apparent from the preceding description that the syllabic companding capability provided by the apparatus of FIG. 5 serves to assist the instantaneous companding apparatus of FIG. 2 in accurately reconverting the quantizer output bit stream to its analog equivalent. However, due to the relatively slow reaction time associated with the syllabic companding circuitry, the basic operational sequence of the remainder of the decoder digital logic, as previously described, in instantaneously companding step sizes in accordance with relatively fast changes in input signal characteristics, is not affected.

The combination of the two companding schemes described above has the advantage of reducing the power required to operate the decoder. Since the addition of syllabic companding apparatus adjusts the output of current source 43 (and therefore the various step amplitudes) so that the number of slope overload occurrences is reduced, the count attained by up/down counter 42 tends to be stabilized at a level that is lower than that which would be attained using instantaneous companding alone. Accordingly, the interval $t_i$ during which time interval counter 45 is operative is correspondingly limited. As mentioned previously, such a reduction in time reduces decoder power requirements.

It is to be understood that the various embodiments described herein are merely illustrative of the principles of the invention. Modifications thereto may be effected by persons skilled in the art without departing from the spirit and scope of the invention.

What is claimed is:

1. In a variable step size delta modulation system arranged to convert an analog signal to a stream of binary bits each occupying a given frame period, apparatus for reconverting said stream of binary bits to a replica of said analog signal, comprising, in combination, means for generating a current for a variable time interval during each of said frame periods, means for converting said current to a voltage proportional to the magnitude of the product of said current and said time interval, and means for adjusting the change in said voltage during each of said frame periods to correspond to the change in said analog signal during said frame period, said last-named means comprising first means responsive to said stream of binary bits for varying said time interval in accordance with relatively short term changes in said analog signal, and second means responsive to said stream of binary bits for simultaneously varying the magnitude of said current in accordance with relatively long term changes in said analog signal envelope.

2. Apparatus in accordace with claim 1 wherein said first means comprises means for monitoring said stream of binary bits in order to provide an increase pulse in the presence of a first predetermined bit sequence and a decrease pulse in the presence of a second predetermined bit sequence, first counting means arranged to count up in response to said increase pulses and to count down in response to said decrease pulses, each of said counts being represented by an output terminal, means for dividing each of said frame periods into a plurality of equal time segments, and means for associating with each of said output terminals representing each of said counts a time interval measured by a predetermined number of said equal time segments.

3. Apparatus in accordance with claim 2 wherein said second means comprises an energy storage element for storing a control voltage, means for increasing said control voltage in response to said increase pulses and decreasing said control voltage in response to said decrease pulses, and means for modulating the magnitude of said current in proportion to said control voltage.

4. Apparatus in accordance with claim 2 wherein said means for monitoring said stream of binary bits includes a one bit memory arranged to compare each of said binary bits to the preceding one of said binary bits, said first predetermined bit sequence comprising successive bits of the same polarity, and said second predetermined bit sequence comprising successive bits of a different polarity.

5. Apparatus in accordance with claim 2 wherein said dividing means comprises means arranged to produce a plurality of timing pulses, and second counting means arranged to count said timing pulses during each of said frame periods, each of said counts being represented by an output terminal corresponding to an integral number of said equal time segments.

6. A variable step size delta modulation decoder comprising, in combination, first means for effecting instantaneous companding of said step sizes and second means for effecting syllabic companding of said step sizes, said first and said second means including means for enabling simultaneous operation thereof.

7. In an adaptive delta modulation system arranged to convert an analog signal to a stream of binary bits each of a given frame period, a decoder arranged to reconvert said stream of binary bits to a replica of said analog signal by periodically adjusting a stored voltage representative of said analog signal comprising, in combination, an energy storage element arranged to provide an output voltage change proportional to a time interval during which current is supplied thereto or extracted therefrom, and digital logic means for periodically controlling said output voltage change to correspond to changes in said analog signal, said last-named means comprising first means for monitoring said stream of binary bits arranged to provide an increase pulse in the presence of a series of bits in a first predetermined sequence indicative of an increasing slope of said analog signal and a decrease pulse in the presence of a series of bits in a second predetermined sequence indicative of a decreasing slope of said analog signal, second means, including a counter having a plurality of output terminals each of which represents a particular count thereof, arranged to count up in response to said increase pulses and to count down in response to said decrease pulses, third means for dividing each of said frame periods into a plurality of equal time segments, fourth means jointly responsive to said second and third means for associating with each of said output terminals a particular number of said equal time segments, and means responsive to said last-named means for supplying a current to said energy storage element for a time interval during each of said frame periods determined by said particular number of time segments and of a polarity determined by said stream of binary bits.

8. In a variable step size delta modulation system arranged to convert an analog signal to a stream of binary bits each occupying a given frame period, means for reconverting said stream of binary bits to said analog signal comprising first means arranged to monitor said stream of binary bits in order to provide an increase pulse in the presence of a first predetermined bit sequence and a decrease pulse in the presence of a second predetermined bit sequence, second means responsive to said first means arranged to increase said step sizes in response to said increase pulses and to decrease said step sizes in response to said decrease pulses, third means arranged to divide each of said frame periods into a plurality of equal time segments, fourth means arranged to associate with each of said step sizes a predetermined number of said time segments, an energy storage element, and fifth means arranged to supply current to said energy storage element of a polarity determined by said stream of binary bits, for a time interval determined by said number of time segments.

9. A variable step size delta modulation decoder for converting a binary bit stream to its analog signal equivalent comprising, capacitive means for storing a voltage representative of said analog signal, a current source connected to said capacitive means for effecting during a portion of each frame period of said binary bit stream a change in said stored voltage, and means responsive to said binary bit stream for controlling the magnitude of said voltage change, said last-named means comprising first means for varying said portion of each of said frame periods during which said current source is actuated, and second means for simultaneously varying the magnitude of the output of said current source.

10. A variable step size delta modulation decoder for converting a binary bit stream to its analog signal equivalent, comprising, capacitive means for storing a voltage representative of said analog signal, a controllable source of current for periodically changing said stored voltage in accordance with a variable step size, and means responsive to said binary bit stream for periodically varying the magnitude of said step sizes, said last-named means comprising first means for effecting instantaneous companding of said step sizes in combination with second means for simultaneously effecting syllabic companding of said step sizes.

11. A decoder for the conversion of a stream of binary bits each of a given frame period to an analog signal representation thereof comprising, in combination, a capacitive element for storing a voltage representative of said analog signal, a memory device for periodically comparing each bit of said bit stream with a predetermined number of previous bits, thereby producing an indication of the magnitude of a deviation of said analog signal from its instantaneous value stored on said capacitive element, a first counter responsive to said memory device having a plurality of output terminals each corresponding to a respective one of the possible counts thereof and representative of the relative magnitude of said deviation, a high speed timer having a frequency *m* times greater than that of said binary bit stream for dividing each of said frame periods into *m* equal time segments, a second counter responsive to said high speed timer having a plurality of output terminals each corresponding to an integral multiple of said equal time segments, coincidence logic for associating with each of said possible counts of said first counter a time interval measured by a predetermined number of said equal time segments, and a current source responsive to said coincidence logic for charging or discharging said capacitive element during said time interval.

* * * * *

UNITED STATES PATENT OFFICE

CERTIFICATE OF CORRECTION

Patent No. 3,784,922 Dated January 8, 1974

Inventor(s) Donald E. Blahut

It is certified that error appears in the above-identified patent and that said Letters Patent are hereby corrected as shown below:

| Column | Line | Error | Should Read |
|---|---|---|---|
| 1 | 43 | ane | and |
| 3 | 13 | and | or |
| 4 | 60 | Thus | This |
| 5 | 48 | clock 41 | clock 14 |
| 8 | 28 | $t_1$ | $t_i$ |
| 9 | 28 | illustrated | illustrates |
| 9 | 55 | incerase pulses | increase pulses |

On the cover sheet delete Item [30] in its entirety.

Signed and sealed this 15th day of October 1974.

(SEAL)
Attest:

McCOY M. GIBSON JR.
Attesting Officer

C. MARSHALL DANN
Commissioner of Patents